United States Patent
Andreev (10) Patent No.: US 8,619,198 B1
(45) Date of Patent: Dec. 31, 2013

(54) ADJUSTING FRAME RATES FOR VIDEO APPLICATIONS

(75) Inventor: Dmitry Andreev, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 716 days.

(21) Appl. No.: 12/430,980

(22) Filed: Apr. 28, 2009

(51) Int. Cl.
*H04N 3/223* (2006.01)
*H04N 11/02* (2006.01)

(52) U.S. Cl.
USPC ...................................... 348/701; 375/240.26

(58) Field of Classification Search
USPC ........................... 348/155, 447, 14.01; 352/38
See application file for complete search history.

(56) References Cited

U.S. PATENT DOCUMENTS

| | | | |
|---|---|---|---|
| 5,825,413 A * | 10/1998 | Mullis | 348/155 |
| 6,055,330 A * | 4/2000 | Eleftheriadis et al. | 382/154 |
| 6,625,333 B1 | 9/2003 | Wang et al. | |
| 6,885,775 B2 * | 4/2005 | Kondo et al. | 382/268 |
| 6,930,752 B2 * | 8/2005 | Baba et al. | 352/38 |
| 7,009,606 B2 | 3/2006 | Hiraga et al. | |
| 7,468,745 B2 | 12/2008 | Xin et al. | |
| 8,165,201 B2 * | 4/2012 | Ho et al. | 375/240.02 |
| 2008/0007614 A1 * | 1/2008 | Mizuhashi et al. | 348/14.01 |

OTHER PUBLICATIONS

Beyond3D Forum, Post: "Motion compensation and reusing last frame image date." Dated May 31, 2008. On-line: http://forum.beyond3d.com/showthread.php?t=48298. Accessed Jul. 8, 2009, 11 pages.

"Trials 2 Second Edition on Steam." 2009. On-line: http://store.steampowered.com/app/16600. Accessed Jul. 8, 2009, 1 page.

* cited by examiner

*Primary Examiner* — David Czekaj
*Assistant Examiner* — Leron Beck
(74) *Attorney, Agent, or Firm* — Kilpatrick Townsend & Stockton LLP

(57) ABSTRACT

A system includes a computing device that includes a memory for storing content of a sequence of frames, and a frame predictor. The frame predictor determines a difference between content of a first frame and content of a second frame, in which the first and second frames are adjacent in the sequence of frames. The difference between the content of the first and second frames is representative of image changes included in the content of first and second frames. The frame predictor is configured to produce an intermediate frame using at least one of the first and second frames, and the determined difference. The frame predictor is further configured to insert the intermediate frame into the frame sequence.

44 Claims, 7 Drawing Sheets

ADJUSTING FRAME RATES FOR VIDEO APPLICATIONS

TECHNICAL FIELD

This document relates to adjusting frame rates such as increasing frame rates, for online and offline video applications.

BACKGROUND

For online applications such as video gaming environments, visual responsiveness and visual quality may be inversely proportional. For example as video quality is increased, performance and responsiveness may reduce. Similarly, by increasing responsiveness for such applications (e.g., responsiveness to user interactions), video quality typically suffers. To address these issues, more detailed video content may be produced, however, computational limitations may reduce the ability for rendering the content. Less than optimal video content (such as blurred content) may by rendered in a relatively rapid manner, however, the sacrificed content detail may be noticeable by a viewer of the online or offline application.

SUMMARY

The systems and techniques described here relate to producing and inserting additional frames into frame sequences to increase rate of frame presentation.

In one aspect, a computer-implemented method includes determining a difference between content of a first frame and content of a second frame. The first and second frames are adjacent in a sequence of frames. The difference between the content of the first and second frames is representative of image changes included in the content of first and second frames. The method also includes producing an intermediate frame using one, the other, or both of the first and second frames, and the determined difference. The method also includes inserting the intermediate frame into the frame sequence.

Implementations may include any or all of the following features. Inserting the intermediate frame may include inserting the intermediate frame between the first frame and the second frame. Inserting the intermediate frame may include determining an insertion position between the first and second frames. Determining the insertion position may be based upon a timing signal such as a vertical blanking interval, a rate for presenting the frames, or other similar technique. The difference between the content of the first frame and the content of the second frame may include the difference between a pixel included in the first frame and a pixel included in the second frame. The difference may also include the difference between a group of pixels included in the first frame and a group of pixels included in the second frame. The difference may also be represented, in part, by a velocity associated with a pixel included in the first frame and a pixel included in the second frame, or, by a velocity associated with a group of pixels included in the first frame and a group of pixels included in the second frame. Determining the difference between the content of the first frame and the content of the second frame further may include determining the difference with content of a third frame. Producing the intermediate frame may include using the first frame (or the second frame) and the determined difference as the first frame is being presented.

In another aspect, a system includes a computing device that includes a memory for storing content of a sequence of frames, and a frame predictor. The frame predictor determines a difference between content of a first frame and content of a second frame, in which the first and second frames are adjacent in the sequence of frames. The difference between the content of the first and second frames is representative of image changes included in the content of first and second frames. The frame predictor is configured to produce an intermediate frame using at least one of the first and second frames, and the determined difference. The frame predictor is further configured to insert the intermediate frame into the frame sequence.

In another aspect, a computer program product tangibly embodied in an information carrier and comprising instructions that when executed by a processor perform a method that includes determining a difference between content of a first frame and content of a second frame. The first and second frames are adjacent in a sequence of frames. The difference between the content of the first and second frames is representative of image changes included in the content of first and second frames. The method also includes producing an intermediate frame using one, the other, or both of the first and second frames, and the determined difference. The method also includes inserting the intermediate frame into the frame sequence.

In still another aspect, a system includes a computing device that includes a memory for storing content of a sequence of frames. The computing device also includes a frame predictor for determining a difference between content of a first frame and content of a second frame. The first and second frames are adjacent in the sequence of frames. The difference between the content of the first and second frames is represented, in part, by a velocity associated with changes in an image included in the content of first frame compared to an image included in the content of the second frame. The frame predictor is configured to produce an intermediate frame using at the first frame and the determined difference as the first frame is being presented and as the second frame is being produced. The frame predictor is further configured to insert the intermediate frame between the first frame and the second frame in the frame sequence.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
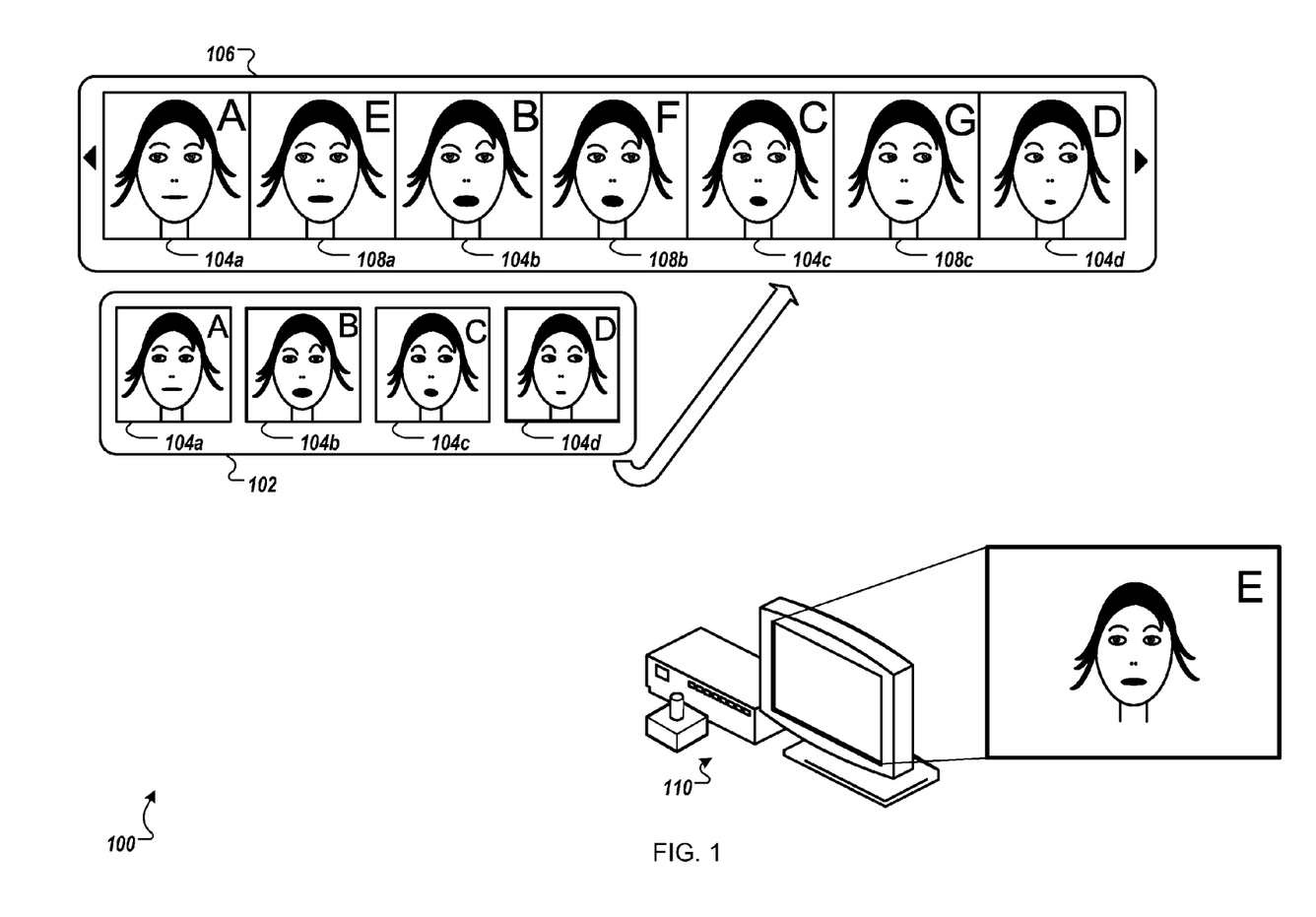
FIG. 1 illustrates a video system capable of presenting video content.

Referring to FIG. 1, an exemplary video system 100 is capable of presenting video content to one or more viewers in real time. For this particular system 100, the video content can be presented for an online application such as a video game. However, other types of online applications that interact with a user may also be used, for example, medical imaging applications, simulation applications, and the like. Off line systems and applications may also be used for video content presentation, for example, movie production may be one application for presenting similar video content.

Various types of video system components and hardware may be used for displaying video. For this illustrated online application, a video game console 110 is capable of presenting video content while interacting with one or more users in an online manner. Other types of video equipment or components may be used separately or in combination with the components of system 100. For example, one or more computer systems, hand held devices (e.g., personal digital assistants (PDAs), cellular telephones, etc.), displays (e.g., televisions) may also be used for online and off line applications.

For content sources, one or more analog or digital techniques may be used for providing the video content for processing and presentation by the system 100. For example, video content may be included in a sequence of frames 102, or other similar vehicles, which can be provided (in this instance) to the game console 110. Along with captured video footage, the video content may also be provided from other video sources. For example, one or more computer graphic generation techniques (e.g., 2D image production, scan-line rendering of a 3D model, etc.) may be used for video production. In this illustration, the video content represents a series of facial expressions of an animated female character's face and each frame within the sequence represents a different facial expression. Various video characteristics and parameters may be associated with each of the frames, for example, each frame may have a particular level of resolution such that an appropriate amount of detail is represented during presentation of the video. The amount of video content may also factor into the presentation of the content. For example, generally more frames provide more content for the viewing experience. Similarly, the rate at which the frames are presented may also effect the quality of the presentation. For example, presenting video content at a relatively low rate provides computational time for rendering the video content (e.g., computer generated graphics), thereby providing relatively high resolution. However, at such low rates, characters or other graphical objects may appear to move in a disjointed manner. Alternatively, a higher frame rate may be utilized so characters appear to move in a smooth and continuous manner. However, higher frame rates may reduce the amount of computational time for rendering the video content and may stress the computational resources to keep pace. As such, presentation quality may suffer and lack the appearance of smooth character movement. By simulating a higher frame rate while providing appropriate computational time for high resolution frame production and rendering, visual complexity may be preserved while also providing the appearance of continuous and fluid motion.

One or more techniques and methodologies may be used to simulate high frame rates from content associated with a relatively lower frame rate. For example, additional frames may be inserted into a sequence of frames (and rendered) to simulate a higher frame rate. Further, by rendering the additional frames within an appropriate time period, high resolution content may be presented with a fluid appearance for online or offline applications.

In this implementation, the game console 110 can produce a video at one or more frame rates for presenting video with particular properties. For example, the game console 110 may be capable of producing video at one or more rates such as 30 frames per second (fps) or 60 fps. When operating at 30 fps, the time period between frames (e.g., approximately 33 milliseconds) is used, for example, to render one frame and produce the next sequential video frame. Similarly, for a game console operating at 60 fps, a smaller amount of time (e.g., approximately 16 milliseconds) is provided for rendering and producing the appropriate frames. As such, each frame of the 30 fps video may be of higher quality, since additional time is provided per frame for processing. However, the 60 fps video may be perceived as a smoother viewing experience by a viewer, since more frames are being shown per second. For example, some viewers may be able to detect a delay or stutter in a 30 fps video compared to a 60 fps video.

By inserting additional frames into the frame sequence 102, the visual quality provided by a lower frame rate (e.g., 30 fps) may be achieved while also providing the smooth motion represented by a higher frame rate (e.g., 60 fps). For example, the frame sequence 102 is represented as including a sequence of individual frames 104 (e.g., frame 104*a, b, c*, and *d*). By inserting additional frames into the frame sequence 102, an enhanced video sequence 106 may be produced that includes the frames 104 (from the sequence 102) and a collection of predicted frames 108 (e.g., 108*a, b, c*). In this particular example, the predicted frames 108 are inserted into the frames 104 in an interleaving manner. To highlight the insertion pattern, alphabetical letters are assigned to each of the frames 104 and the predicted frames 108. As such, the frame sequence 102 is represented by the letters "A", "B", "C", and "D". Similarly the predicted frames 108 are represented with the letters "E", "F" and "G". By inserting the frames in an alternating pattern, as shown in the figure, the enhanced frame sequence 106 is produced in which the predicted frames 108 respectively alternate with the frames of the frame sequence 102 to produce the frame sequence "A", "E", "B", "F", C", "G" and "D". While this pattern alternates between frames and predicted frames, other patterns may be utilized. For example, two or more predicted frames may be inserted between each frame of the frame sequence 102, or another similar repetitive (or non-repetitive) type of pattern.

In this instance, inserting additional frames into the frame sequence simulates a higher frame rate (e.g., an up-converted rate) of the frame sequence 102. In particular, by inserting an additional frame between each frame pair of sequence 102, a higher frame rate (e.g., 60 fps) is simulated from a relatively lower frame rate (e.g., 30 fps). While this example increases the frame rate be a factor of two, based upon the number of frames inserted, additional frame rate up-conversions may be achieved. For example, a frame rate may be increased by a factor of three or higher by uniformly or non-uniformly inserting additional frames.

One or more types of methods and techniques may be used for producing the predicted frames, for example, content represented in one or more frames of the sequence 102 may be used for frame production. Adjacent frame pairs (e.g., frames 104*a* and 104*b*) between which a predicted frame is to be inserted, can be used for producing a predicted frame (e.g., 108*a*). Similarly, additional frames (e.g., frames 104*a-c*) that may not be adjacent can be used to produce one or more predicted frames.

For applications such as offline applications (e.g., movie production), frames are typically produced well in advance of the final product being prepared for viewers (e.g., presented in a theater, stored on a DVD, etc.). As such, computational resources and processing time may be abundant for producing additional frames (for insertion) from many previously produced frames. However, situations may occur in which frame rate adjustments may be warranted and call for producing and inserting additional frames. For example, additional frames for low rate video recording may be produced and inserted for presentation on hardware that uses a higher native frame rate.

For some online applications, in which video is being presented in real time, previously presented content may be known while future content is unknown. For example, previous actions (e.g., movements) of a video game character may be known while future actions remain unknown until user input (e.g., interactions with a joystick) is provided. In another example, a video representing medical imaging of a patient (e.g., Doppler ultrasound of a blood vessel) may be ordered for analyzing blood flow. As such, a currently collected video frame and one or more previously collected frames may be used for predicting one or more frames for insertion to provide a real time frame sequence.

Along with up-converting frame rates with high quality inserted intermediate frames, original image content need not be obscured. For example, some conventional techniques attempt to reduce the delay or the stutter of a slow frame rate video (e.g., 30 fps) by blurring objects that move relative to the viewer. While such blurring may give a smooth video appearance, such motion blur can reduce the overall quality of the video and introduce less than desirable artifacts into the video. In another conventional technique, the detail of model may be reduced if the model is not likely to be the focus of a viewer's attention. Such techniques may reduce computational needs for producing frames for higher frame rates (e.g. 60 fps), however similar to blurring, image clarity and detail are sacrificed. By producing and inserting intermediate frames of quality video, high frame rates can be achieved without sacrificing detail.

Figure 2:
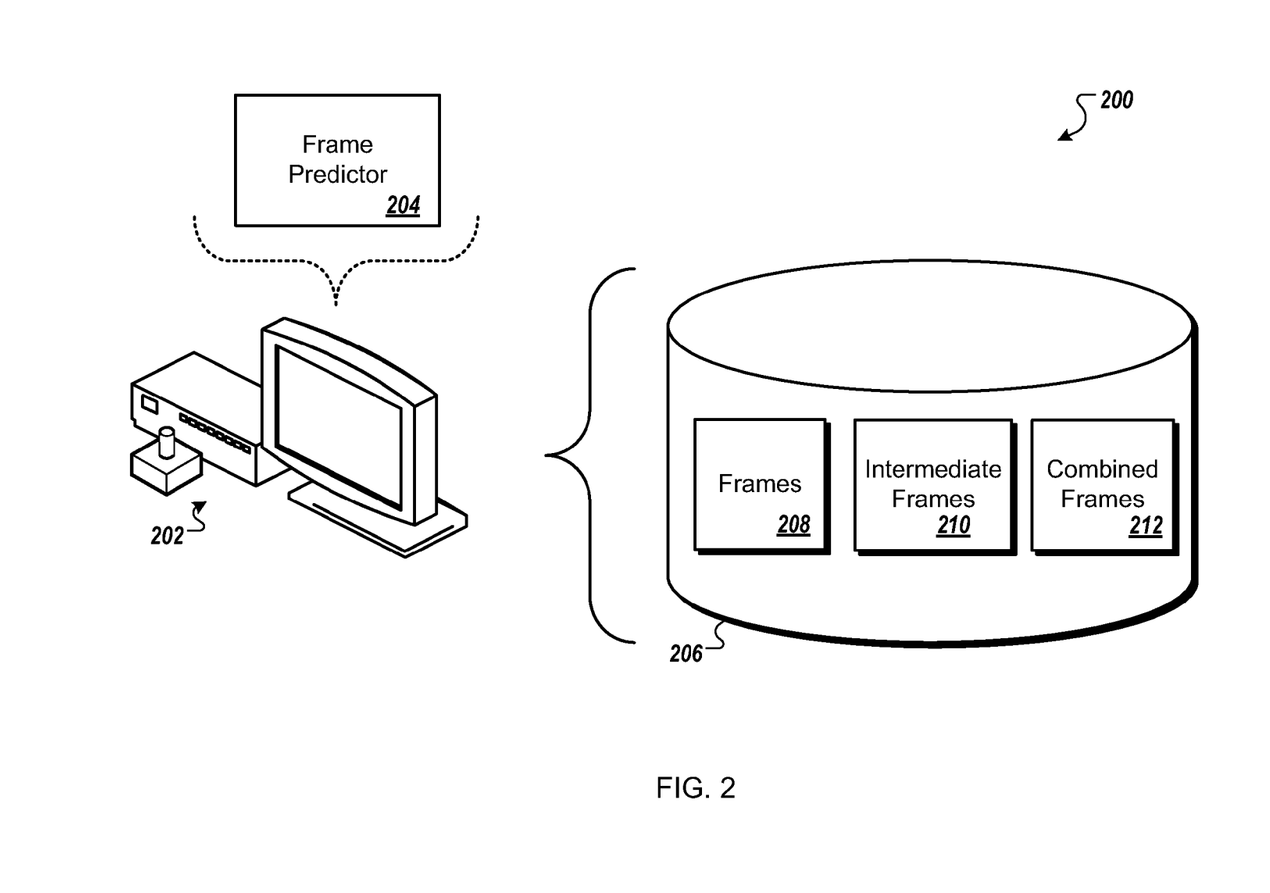
FIG. 2 illustrates components of a video system for processing and presenting video content.

Referring to FIG. 2, a system 200 is capable of producing and inserting frames in a sequence of video frames (such as the sequence 102 of FIG. 1). Similar to FIG. 1, a game console 202 is included in the system 200 for executing the operations to produce and insert the additional frames and up-convert the frame rate of a frame sequence. In this particular example, a frame predictor 204 is executed by the game console 202 to provide such functionality. The frame predictor 204 may be implemented in hardware, software or a combination of hardware and software to produce and insert frames into a frame sequence. For example, the frame predictor 204 may use provided frames and user input (e.g., a player's interaction with a game title) to produce additional frames for insertion. Various computational architectures and environments may be utilized. For example, the frame predictor 204 may be executed in a single location, such as on a computer system or other type of computing device for video processing, a distributed computing environment such as a server farm, and/or on a computer that is logically or physically remote from a device used to present the video or collect data (e.g., user input) for producing the video. Along with online applications (e.g., video games, etc.), the frame predictor 204 may also be used for offline applications. For example, the frame predictor 204 may be executed by one or more computer systems for movie production or other similar applications.

For storage, the game console 202 is illustrated as including a data storage device 206 (e.g., a hard drive, CD-ROM, etc.) that is capable of storing various types of data and information. For example, a particular game title (e.g., stored on a game cartridge, CD-ROM, DVD, etc.) may be provided to the game console 202 (e.g., a cartridge connected, CD-ROM or DVD inserted) to includes video content. As represented in the figure, during the course of user interaction with the game title (e.g., game play) video frames 208 may be produced and stored on the storage device 206. To up-convert the frame rate of the video frames 208, the frame predictor 204 may produce additional frames, referred to as intermediate frames 210, for insertion into the frames 208. The intermediate frames may have similar or equivalent characteristics (e.g., resolution) as the video frames 208. Along with producing the intermediate frames 210, operations of the frame predictor 204 may include inserting the intermediate frames into the frames 208 to produce a set of combined frames 212. By presenting the set of combined frames 212, a higher frame rate is simulated for presenting relative high resolution video.

Figure 3:
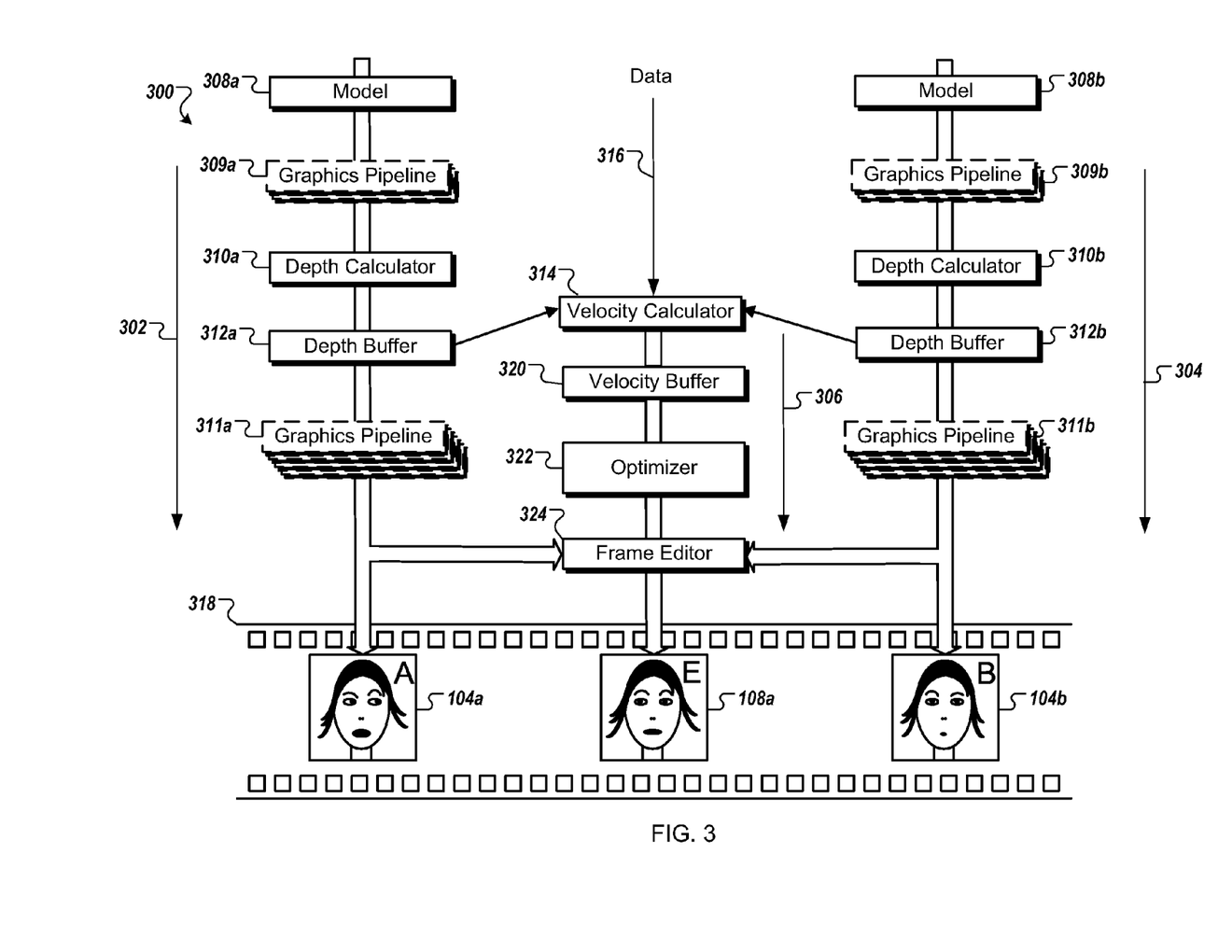
FIG. 3 illustrates production of a video frame for insertion into a sequence of frames.

Referring to FIG. 3, a diagram 300 illustrates one arrangement of processing stages for producing and inserting intermediate video frames into a video frame sequence. For example, the frame predictor 204 (shown in FIG. 2) may provide the functionality of one or more of the processing stages illustrated in the figure. In general, three productions paths are illustrated for respectively producing three video frames. One production path 302 is illustrated as producing the video frame 104a (shown in FIG. 1) from a model 308a. The model 308a represents one of various types of sources that is capable of providing content for the frame 104a. For example, the model 308a may be associated with an online application such as a game character model, a virtual environment or game world (or a combination of similar subject matter). The model 308a may also be associated with offline applications, such as a character model for a motion picture or television show. From the processing stages provided by the production path 302, the frame 104a is produced and prepared for presentation. For illustrative purposes, the frame 104a is shown being inserted onto a film strip 318 to convey the sequential production and arranging of the video frames. Other mediums and techniques may be employed for holding the video frames in preparation for rendering on a display. For example, one or more buffers, memories (e.g., random access memory (RAM), dynamic RAM (DRAM), a hard drive, etc.) and storage mechanisms may be implemented for frame storage.

In a similar manner, the production path 304 also produces a frame (i.e., the video frame 104b) from a model 308b. In some arrangements, the model 308b is substantially similar (or is equivalent) to the model 308a. In some situations, the model 308b can be the model 308a with a transformation applied. For example, an animated character may be represented by the model 308a and the model 308b may represent the character in a different position (e.g., based upon user input).

Based upon the production of the frames 104a and 104b, one or more intermediate frames may be predicted and produced by a production path 306. In this illustration, the predicted frame 108a is shown as being produced by the production path 306. In one arrangement, as the frame produced by production path 302 (e.g., frame 104a) is presented (e.g., on a display) and as the production path 304 is creating the next frame (e.g., frame 104b), the production path 306 uses information from the other production paths 302, 304 to produce the predicted frame 108a. Further, the production path 306 can insert the predicted frame 108a at an appropriate location between the frames 104a and 104b. As such, the predicted frame 108a would be presented after the frame 104a and prior to the frame 104b. Further, during the time period allocated to produce and prepare frame 104b for presentation, an intermediate frame (e.g., predicted frame 108a) may be produced and presented. In this particular arrangement, the production path 306 produces and inserts a single intermediate frame, however, in other arrangements, two or more intermediate frames may be predicted, produced and inserted in the frame sequence 318. Such additional frame production may affect system performance. For example, using additional frames may call for additional memory along with delaying production, however, increased image quality and resolution may be attained.

Referring to the production path 302, one or more techniques and methodologies may be implemented for frame production (e.g., to produce frame 104a). For example, graphic pipelines 309a and 311a may operate on portions of the model 308a for frame production. Functions such as modeling transformation, per-vertex lighting, projection transformation and other operations may be provided by the pipelines 309a and 311a.

The production path 302 also includes a depth calculator 310a that provides, for example, a depth measure for the frame being produced (e.g., frame 104a). For example, the depth calculator 310a may determine the distance between portions of the model 308a and a viewing location (e.g., the location of a camera). In one arrangement, a distance value may be determined for individual pixels or groups of pixels included in a frame. For this arrangement, distance values are determined for each pixel of a two-dimensional grid along the direction of view (e.g., the z coordinate). Once determined, the depth values may be stored in a depth buffer 312a (referred to as a z-buffer in some arrangements) that is typically arranged as a two-dimensional array in which each element is associated with a screen pixel. Once calculated (and stored), the depth values may be provided for frame processing. In this particular arrangement, the depth calculator 310a and the depth buffer 312a are positioned between the graphics pipelines 309a and 311a, however, in some arrangements one or both of the depth calculator and depth buffer may be located at a different position along the production path 302.

Similar to the production path 302, the production path 304 also includes a pair of graphics pipelines 309b, 311b, a depth calculator 310b and a depth buffer 312b. Similar to the depth calculator 310a, in this example the depth calculator 310b calculates the depth values on a per pixel basis (e.g., for the frame 104b) and may store the values in the depth buffer 312b (e.g., in a two-dimensional array). While two distinct production paths 302 and 304 are used in this arrangement for frame production, more or less production paths may also be implemented. For example, the frame predictor 204 may use one production path for creating frames, or, three or more production paths may be implemented.

From information provided by the production paths 302 and 304, one or more techniques and methodologies may be implemented by the production path 306 for producing one or more intermediate frames and inserting the intermediate frames into a sequence of frames. In this arrangement, depth information stored in the depth buffers 312a, 312b is used for frame prediction. In particular, the production path 306 includes a velocity calculator 314 that uses the depth information from the depth buffers 312a, 312b to represent the change of the model 308a (e.g., represented in frame 104a) compared to the model 308b (e.g., represented in frame 104b). Along with the depth information provided by the depth buffers 312a, 312b, additional data 316 may also be used by the velocity calculator 314. For example, data representing changes in view perspectives (e.g., changes in camera position), changes to objects represented in the scene (e.g., velocity of objects), user input (e.g., from joystick interactions), and the like. Based upon information from the depth buffers 312a, 312b and the additional data 316, the velocity calculator 314 calculates a velocity for one or more points represented in each of the frames 104a, 104b. In general, such velocities represent the changes experienced by content of one frame (e.g., frame 104a) to another frame (e.g., frame 104b). While two frames (e.g., 104a and 104b) may be used by the velocity calculator 314 (as illustrated in the figure), similar information associated with additional frames (e.g., from a similar production path to produce frame 104c) may be used by the velocity calculator 314 to produce velocities that incorporate additional content.

In one arrangement, the velocities are determined on a per pixel basis, while in some arrangements the velocities may be determined for blocks of pixels. In general, neighboring pixels tend to change in a similar manner. As such, block processing may be used by the production path 306. For example, eight-by-eight pixel blocks may be defined and a frame may be grouped into non-overlapping pixel blocks for processing. Similarly, other uniform or non-uniform block sizes may be defined and used for pixel grouping, thereby reducing memory and processing needs.

By calculating the velocities for each pixel or pixel group, a range can be determined that represents the change in content from the frame 104a to the frame 104b (or more, if additional frames are used). Similar ranges can be determined for other pixels (or pixel blocks) and can represent frame differences as provided by the velocity calculator 314. In some arrangements, once quantified by the velocity calculator 314, data representing the velocity information is stored in a velocity buffer 320 at a particular resolution (which may be equivalent or lower than the resolution of the frames, e.g., frames 104a and 104b).

The production path 306 also includes an optimizer 322 to provide additional functionality. For example, the optimizer 322 may further condition the contents of the velocity buffer 320. Such conditioning may include adjusting (e.g., filtering) the velocities prior to being used to produce one or more intermediate frames.

The production path 306 also includes a frame editor 324 that uses the velocity information from the velocity buffer 320 to produce one or more intermediate frames (e.g., predicted frame 108a). For example, the frame editor 324 may use a previously constructed frame as a base frame to produce the one or more intermediate frames. In one arrangement, as frame 104a is being rendered and presented, the frame editor 324 uses the frame 104a to construct the predicted frame 108a (from information provided by the velocity buffer 320). In a similar manner, the frame editor 324 may use frame 104b (as it is being produced) along with the velocity information to construct predicted frame 108a. As illustrated in the figure, information and content associated with both of the frames 104a and 104b are provided (respectively by the production paths 302 and 304) to the frame editor 324 for the production of the frame 108a. However, in some implementations, a single frame (e.g., frame 104a) may be provided to the frame editor 324 for intermediate frame production, or, portions of one or more frames may be provided for intermediate frame production. Various methods may be used for selecting information from the velocity buffer 320, for example, information associated with the time instance directly between the frames 104a, 104b may be used to produce a single frame (e.g., frame 108a). Further, interpolation techniques may be utilized to identify appropriate pixel values for the intermediate frame. For multiple intermediate frames, different time periods along with interpolation may be used to identify velocity buffer information for frame construction.

Similar to constructing frames for inserting between frames, in some arrangements, the frame editor 324 may construct and project frames to extend a frame sequence. For example, by using the velocity information (stored in the velocity buffer 320) and one or more frames (e.g., frame 104a, 104b), a frame such as 108b (shown in FIG. 1) may be produced and positioned in the frame sequence after frame 104b. As such, frames may be produced from velocity information associated with a series of frames and positioned at a corresponding end of the frames series (thereby extending the series). For projecting one or more such frames, various methodologies may be implemented such as extrapolation techniques.

Figure 4:
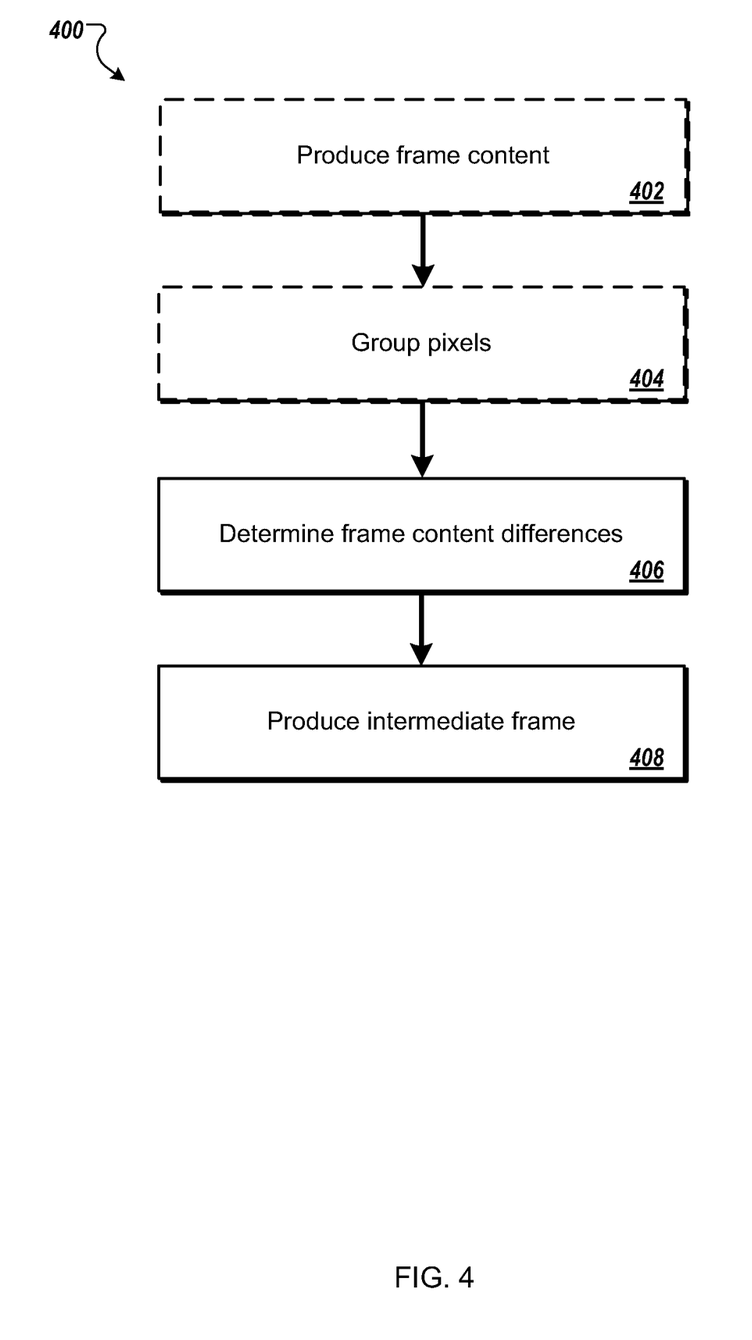
FIG. 4 is a flowchart that represents operations of a frame predictor.

Referring to FIG. 4, a flowchart 400 represents some of the operations of the frame predictor 204 associated with for producing one or more intermediate frames for insertion into a frame sequence. Typically, the frame predictor 204 is executed at a single site (e.g., on one video game console, computer system, etc.), however, in some implementations, operation execution may be distributed among two or more sites (e.g., executed across multiple computer systems).

Operations include producing 402 frame content, such as the content or a portion of the content for frames 104a and 104b. In some arrangements, the frames may be previously produced, as such frame production by the frame predictor 204 may be considered optional (as indicated with the dashed line for the operation in the figure). Along with being previously produced, frames for example, may be currently produced by another process.

The frame predictor 204 may also execute optional operations that include grouping 404 portions (e.g., pixels) of some (or all) of the produced frame content. For example, pixels may be grouped in preparation of processing frame content in a pixel block manner. However, in some arrangements, pixels grouping may be bypassed to allow for processing on an individual pixel basis.

Operations of the frame predictor 204 may also include determining 406 changes among the content of two or more frames. Such changes may be based upon, for example, velocities (calculated from depth values) associated with corresponding pixels from content for each frame (or from pixel blocks). For example, a frame can consist of 1,296,000 pixels and correspond to a resolution of 1440 pixels by 900 pixels. For pixel based processing, a velocity may be calculated (and stored in a velocity buffer) that includes 1,296,000 values. For an example of block pixel processing, the frame (with 1440 by 900 resolution) may be processed such that 8 pixel groups are formed, thereby producing 162,000 pixel groups. As such, for this example, a velocity buffer can be used that stores 162,000 values. In addition to calculating velocities to represent the differences between the content of two frames, additional frame content may be included in velocity calculations. For example, the content of three or more frames may be used to calculate velocities (that are stored in a velocity buffer) to represent content changes as transitioning through the sequence of three or more frames.

Operations of the frame predictor 204 may also include producing 408 one or more intermediate frames (e.g., intermediate frames 210). For example, velocity information (along with other information) can be used to estimate the pixels of one or more intermediate frames. Intermediate frames may also be produced by projecting velocity information to a particular time or location of a frame sequence. Additional information may also be used for producing the one or more intermediate frames. For example, user input (e.g., controlling an animated character) and camera position information (e.g., data representing camera movement and rotation) can be used for adjusting pixels of an intermediate frame in preparation of insertion in a frame sequence. Such user input may also be used in frame production.

Figure 5:
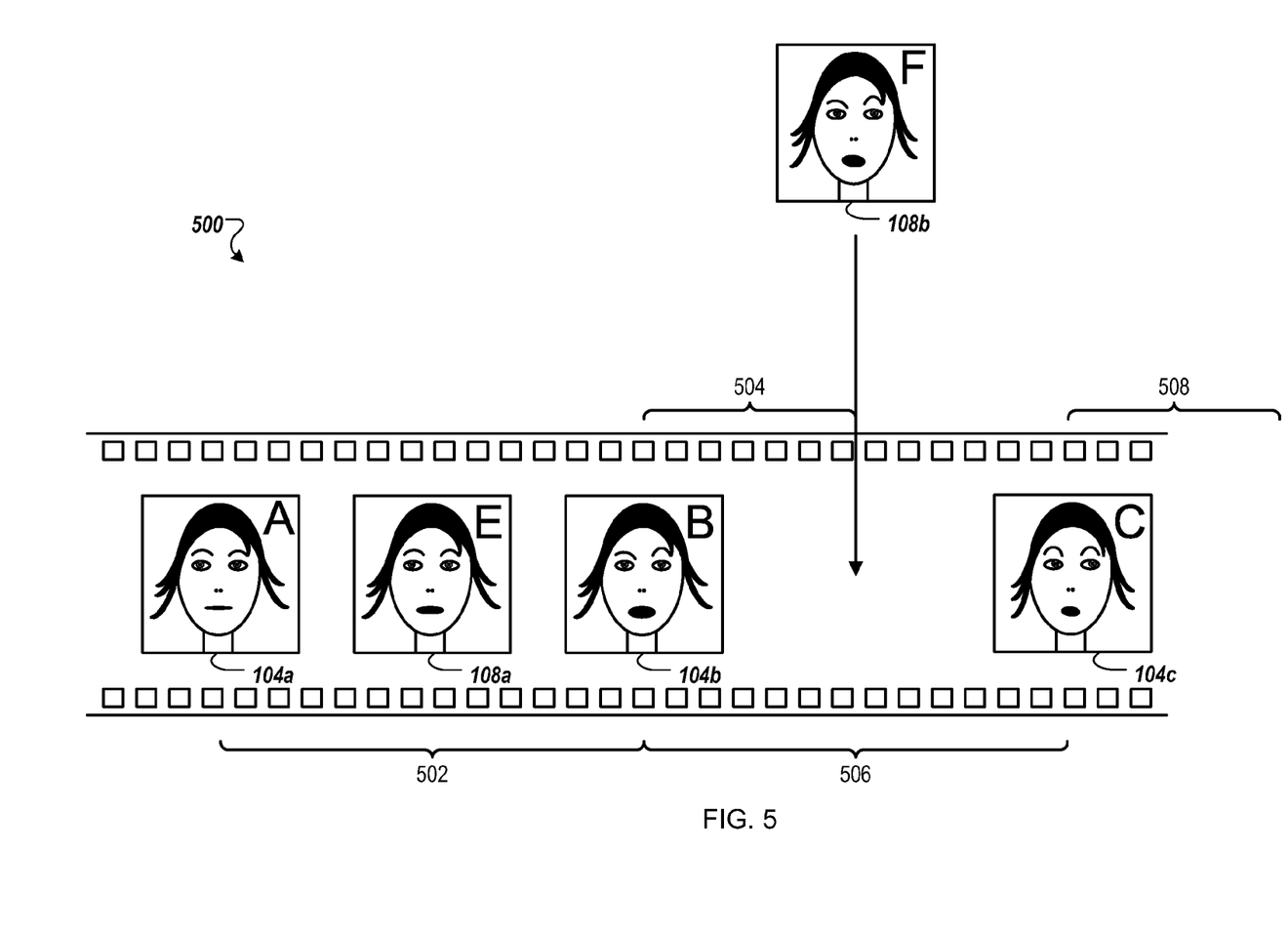
FIG. 5 illustrates identifying a location for inserting a frame.

Referring to FIG. 5, upon producing an intermediate frame or multiple intermediate frames (e.g., the intermediate frames 210) one or more methodologies and techniques may be implemented for identifying one or more insertion points in a frame sequence and inserting the intermediate frames. In this illustration, frames 108a and 108b are being inserted into a frame sequence that includes frames 104a, 104b and 104c (as shown in FIG. 3). In general, the frames being inserted (e.g., frames 108a, 108b) are inserted into positions such that a smooth video presentation is provided by the enhanced frame sequence.

In one exemplary arrangement, a predefined event or timing signal is used to identify frame insertion locations. For example, a vertical blanking interval (VBLANK) can be used to as a timing signal for defining the locations for inserting intermediate frames. In some implementations, the VBLANK can represent the timing of some video displaying devices. When a frame is displayed, such devices refresh their screens by turning the screen blank before showing each scan line of a new frame. Use of such signals may also depend upon frame rate, for example, if the playback frame rate is at or above a particular rate (e.g., 30 fps), VBLANK may be used for insertion timing. However, if the frame rate drops below a particular threshold value (e.g., 30 fps), another methodology may be implemented by the frame predictor 204. By using VBLANK as an insertion technique, processing delays may be experienced due to frame production and other similar processing operations. However, by detecting and quantifying such delays, one or more compensation techniques may be implemented for providing appropriate corrective action. One or more buffering techniques may also be implemented with a timing signal such as the VBLANK. For example, based upon the timing signal, buffer operations (e.g., initiating buffer use, flipping between buffers, etc.) may be activated.

Timing characteristics associated with a frame sequence may also be used to identify insertion locations for the intermediate frames. For example, a time period between two produced frames (in a frame sequence) may be used for defining one or more insertion locations. The frame rate for presenting a video sequence may also be used for defining insertion locations. For example, the time period between frames may be determined from a frame rate, measured, or using one or more other techniques. The time period between frames can then be divided (e.g., divided in half) to identify insertion locations.

In this illustration, a time delay 502 represents the amount of time that separates frame 104a and 104b (using a midframe point as reference points). One or more events may be used to define this time delay 502, for example, buffer operations such as switching between respective buffers to access each of the frames 104a, 104b may define the time period. Based upon the frame rate (e.g., 30 fps) for presenting the frames, this time delay (e.g., 33 milliseconds) may be predefined and used, for example, to insert a frame (e.g., frame 108b) after frame 104b. In particular, such an insertion up-converts the frame rate, in this case by a factor of two, by inserting the predicted intermediate frame (e.g., frame 108b) between each pair of produced frames (e.g., 104b and 104c). As such, a value representing half of the time delay 502 (e.g., 33 milliseconds) is calculated and is used to identify the insertion location of the intermediate frame (when produced). For example, a time delay 504 (e.g., 16.6 milliseconds) represents half of the time delay 502 (e.g., 33 milliseconds) and defines the insertion point for the frame 108b (relative to the frame 104b). Similarly, the insertion point may also be determined relative to the frame 104c. For example, as frame 104b is being presented, the frame 108*b* may be inserted (between frame 104*b* and 104*c*) relative to the location of frame 104*c* within the sequence.

Similar to determining the time delay 504 (from the time delay 502), a time delay 506 between frames 104*b* and 104*c* (again, based on the initial frame rate) can be used to calculate a time delay 508 for inserting a subsequent intermediate frame (e.g., frame 108*c*, not shown). The calculated time delay 508 may be similar or even equivalent to the earlier calculated time delay 504. However, transient system abnormalities (that are not present during the time period 502) may be detected during the time delay 506. In this implementation, similar to the time delay 504 (with respect to the time delay 502), the time delay 508 represents half of the time delay 506 (and defines the insertion point of the frame 108*c*).

Other timing techniques may also be implemented, for example, one or more timing signals such as VBLANK may be used for identifying insertion locations. In some arrangements, such timing signals may be dedicated for identifying insertion locations, or in some arrangements, the timing signals may also be used for other functionality.

In some arrangements, such location identification functionality may be included in the frame predictor 204, provided by another process, or provided by a combination of the frame predictor 204 and one or more processes. Similarly, timing signals may be produced by the frame predictor 204, or generated by one or more other processes, and used by the frame predictor.

Figure 6:
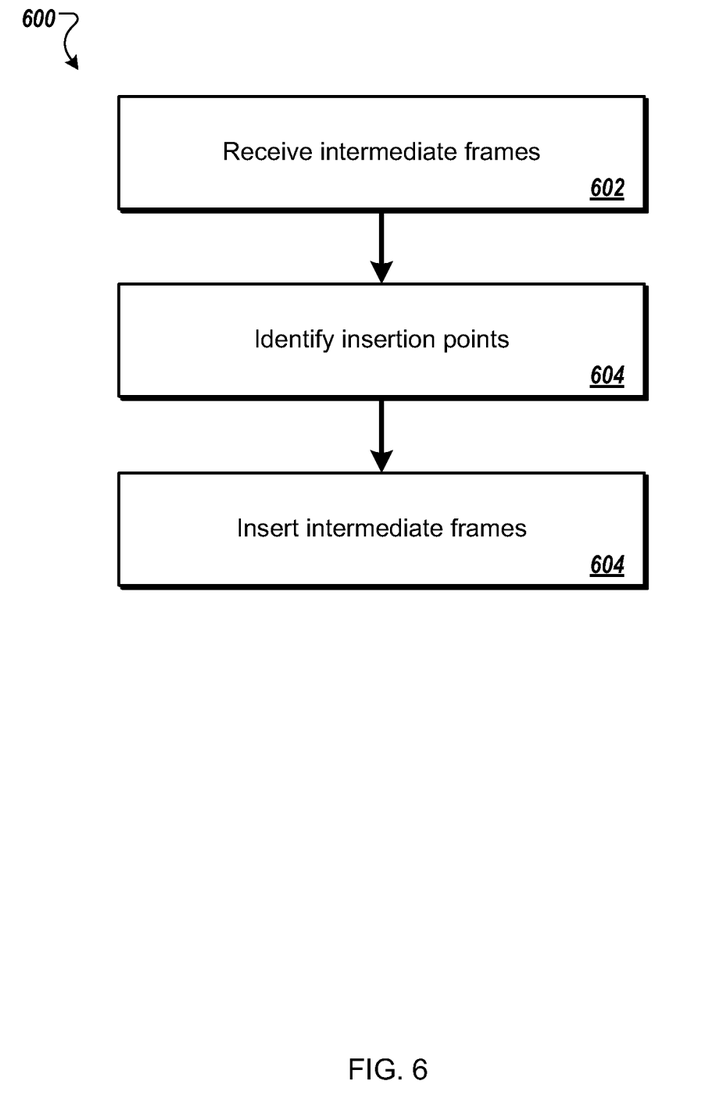
FIG. 6 is a flowchart that represents further operations of a frame predictor.

Referring to FIG. 6, a flowchart 600 represents some of the operations of the frame predictor 204 for inserting intermediate frames in a sequence of video frames. Similar to the flowchart 400, the frame predictor 204 is executed at a single site (e.g., on one video game console, computer system, etc.), however in some implementations, execution of these operations may be distributed among two or more sites (e.g., executed across multiple computer systems).

In this implementation, operations include receiving 602 one or more frames such as one or more intermediate frames (e.g., predicted and produced by the frame predictor 204) for insertion as intermediate frames in a frame sequence. In one arrangement, the received frames are produced from a velocity buffer (e.g., velocity buffer 320) that uses content from other frames. Other similar methods and techniques may also be used for preparing the received frames.

Operations may also include identifying 604 locations for inserting the received frame or frames. For example, one or more timing signals may be used to identify insertion points. Timing characteristics of the frame sequence (into which frames are being inserted) may also be used. For example, the frame rate for presenting the frame sequence may be used to define time periods between frames. By processing these time periods (e.g., dividing the time periods), insertion points may be defined. For example, by dividing a time period (associated with a particular frame rate) by a factor of two, insertion points may be identified for doubling the frame rate. Other factors may also be used for further increasing the frame rate for frame presentation.

Operations also include inserting 604 one or more of the received intermediate frames. For example, upon identifying a location for a particular intermediate frame, the frame may be inserted. Frames may be inserted using one or more methodologies and techniques, for example, one or more intermediate frames may be inserted between one frame currently being presented and another frame (that sequentially follows) being constructed (or recently been constructed). Various buffering techniques may also be implemented for inserting intermediate frames as frame are constructed and presented.

Figure 7:
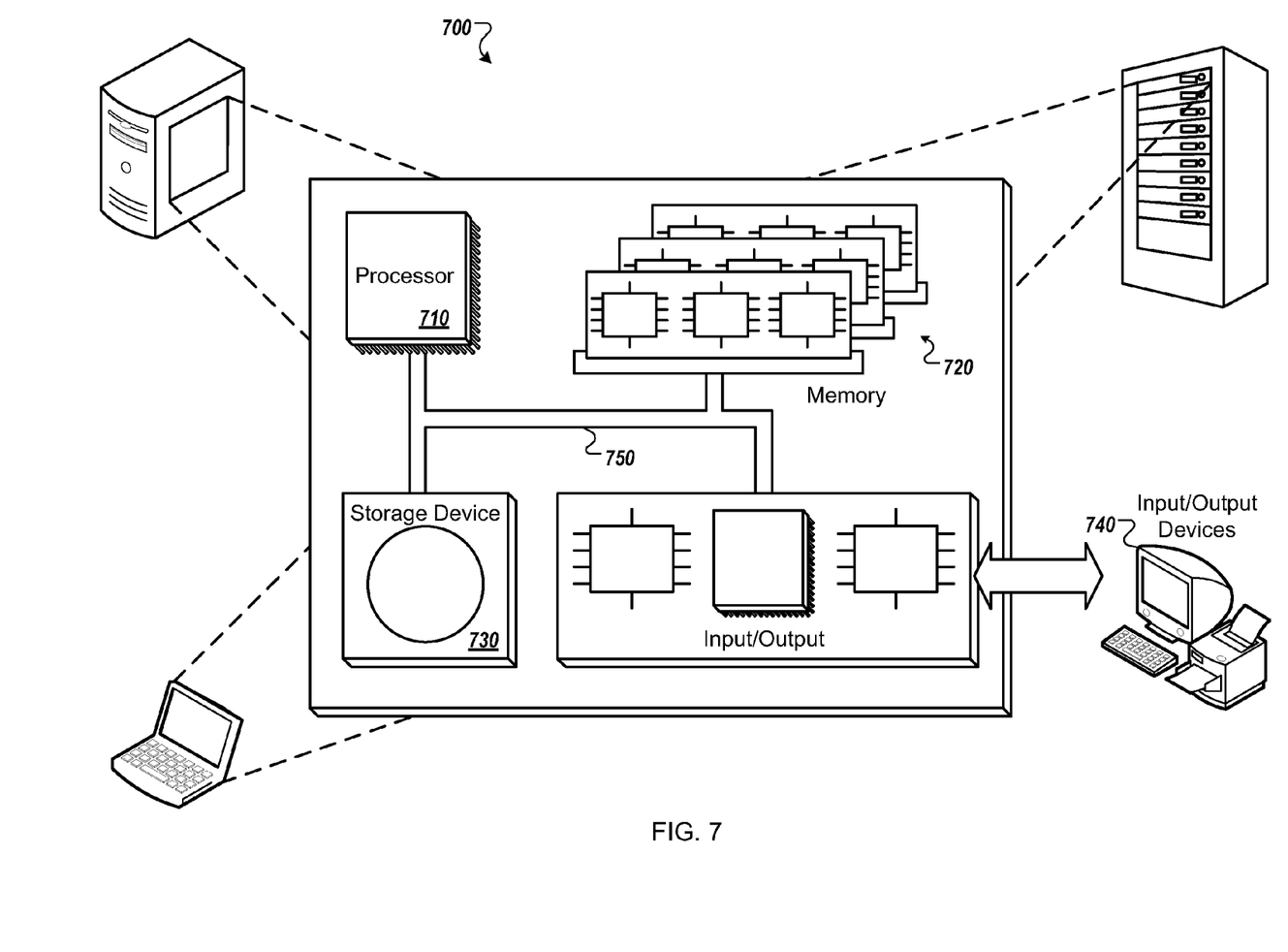
FIG. 7 illustrates a schematic diagram of a computer system and related components.

Referring to FIG. 7, a schematic diagram is shown of an example of a generic computer system 700. The system 700 can be used for the operations described in association with the flowcharts 400 and 600 of the frame predictor 204 according to one implementation. For example, the system 700 or portions of the system may be included in the game console 110, or other similar systems for producing and/or inserting frames into a sequence of frames.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700 and may associated with various characteristics and implementations. For example, the memory 720 may include various types of computer-readable medium such as volatile memory, a non-volatile memory and other types of memory technology, individually or in combination.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
producing a first frame and a second frame, wherein the first and second frames are adjacent in a sequence of frames;
determining a difference between content of the first frame and content of the second frame, wherein the difference between the content of the first and second frames is representative of image changes included in the content of first and second frames;
calculating depth information from content of at least one of the first and second frames;
calculating velocity from the calculated depth information, wherein the velocity is representative of image changes included in the content of first and second frames;
producing an intermediate frame using the calculated velocity, depth information, and the determined difference, wherein a portion of the intermediate frame is produced as at least one of the first frame and the second frame is being produced; and
inserting the intermediate frame into the frame sequence.

2. The computer-implemented method of claim 1, wherein inserting the intermediate frame includes inserting the intermediate frame between the first frame and the second frame.

3. The computer-implemented method of claim 1, wherein inserting the intermediate frame includes determining an insertion position between the first and second frames.

4. The computer-implemented method of claim 3, wherein determining the insertion position is based upon a timing signal.

5. The computer-implemented method of claim 3, wherein determining the insertion position is based upon a vertical blanking interval.

6. The computer-implemented method of claim 3, wherein determining the insertion position is based upon a rate for presenting the frames.

7. The computer-implemented method of claim 1, wherein the difference between the content of the first frame and the content of the second frame includes the difference between a pixel included in the first frame and a pixel included in the second frame.

8. The computer-implemented method of claim 1, wherein the difference between the content of the first frame and the content of the second frame includes the difference between a group of pixels included in the first frame and a group of pixels included in the second frame.

9. The computer-implemented method of claim 1, wherein the velocity is associated with a pixel included in the first frame and a pixel included in the second frame.

10. The computer-implemented method of claim 1, wherein the velocity is associated with a group of pixels included in the first frame and a group of pixels included in the second frame.

11. The computer-implemented method of claim 1, wherein determining the difference between the content of the first frame and the content of the second frame further includes determining the difference with content of a third frame.

12. The computer-implemented method of claim 1, wherein producing the intermediate frame includes using the first frame and the determined difference as the first frame is being presented.

13. The computer-implemented method of claim 1, wherein producing the intermediate frame includes using the second frame and the determined difference as the first frame is being presented.

14. A system, comprising:
a computing device comprising:
a memory for storing content of a sequence of frames; and
a frame predictor for determining a difference between content of a first frame and content of a second frame, wherein the first and second frames are adjacent in the sequence of frames, wherein the difference between the content of the first and second frames is representative of image changes included in the content of first and second frames, and wherein the frame predictor is configured to:
calculate depth information from content of at least one of the first and second frames;
calculate velocity from the calculated depth information;

produce an intermediate frame using velocity, depth information, and the determined difference, wherein a portion of the intermediate frame is produced as at least one of the first frame and the second frame is being produced, and insert the intermediate frame into the frame sequence.

15. The system of claim 14, wherein intermediate frame is inserted between the first frame and the second frame.

16. The system of claim 14, wherein the frame predictor is configured to determine an insertion position between the first and second frames.

17. The system of claim 16, wherein the insertion position is determined based upon a timing signal.

18. The system of claim 16, wherein the insertion position is determined based upon a vertical blanking interval.

19. The system of claim 16, wherein the insertion position is determined based upon a rate for presenting the frames.

20. The system of claim 14, wherein the difference between the content of the first frame and the content of the second frame includes the difference between a pixel included in the first frame and a pixel included in the second frame.

21. The system of claim 14, wherein the difference between the content of the first frame and the content of the second frame includes the difference between a group of pixels included in the first frame and a group of pixels included in the second frame.

22. The system of claim 14, wherein the velocity is associated with a pixel included in the first frame and a pixel included in the second frame.

23. The system of claim 14, wherein the velocity is associated with a group of pixels included in the first frame and a group of pixels included in the second frame.

24. The system of claim 14, wherein the difference between the content of the first frame and the content of the second frame is determined with the difference with content of a third frame.

25. The system of claim 14, wherein the intermediate frame is produced using the first frame and the determined difference as the first frame is being presented.

26. The system of claim 14, wherein the intermediate frame is produced using the second frame and the determined difference as the first frame is being presented.

27. The system of claim 14, wherein the frame sequence is used by an on line application.

28. The system of claim 14, wherein the frame sequence is used for an off line application.

29. A computer program product tangibly embodied in a machine-readable storage device and comprising instructions that when executed by a processor perform a method comprising:

determining a difference between content of a first frame and content of a second frame, wherein the first and second frames are adjacent in a sequence of frames, the difference between the content of the first and second frames is representative of image changes included in the content of first and second frames;

calculating depth information from content of at least one of the first and second frames;

calculating velocity from the calculated depth information;

producing an intermediate frame using velocity, depth information, and the determined difference wherein a portion of the intermediate frame is produced as at least one of the first frame and the second frame is being produced; and inserting the intermediate frame into the frame sequence.

30. The computer program product of claim 29, wherein inserting the intermediate frame includes inserting the intermediate frame between the first frame and the second frame.

31. The computer program product of claim 29, wherein inserting the intermediate frame includes determining an insertion position between the first and second frames.

32. The computer program product of claim 31, wherein determining the insertion position is based upon a timing signal.

33. The computer program product of claim 31, wherein determining the insertion position is based upon a vertical blanking interval.

34. The computer program product of claim 31, wherein determining the insertion position is based upon a rate for presenting the frames.

35. The computer program product of claim 29, wherein the difference between the content of the first frame and the content of the second frame includes the difference between a pixel included in the first frame and a pixel included in the second frame.

36. The computer program product of claim 29, wherein the difference between the content of the first frame and the content of the second frame includes the difference between a group of pixels included in the first frame and a group of pixels included in the second frame.

37. The computer program product of claim 29, wherein the velocity is associated with a pixel included in the first frame and a pixel included in the second frame.

38. The computer program product of claim 29, wherein the velocity is associated with a group of pixels included in the first frame and a group of pixels included in the second frame.

39. The computer program product of claim 29, wherein determining difference between the content of the first frame and the content of the second frame further includes determining the difference with content of a third frame.

40. The computer program product of claim 29, wherein producing the intermediate frame includes using the first frame and the determined difference as the first frame is being presented.

41. The computer program product of claim 29, wherein producing the intermediate frame includes using the second frame and the determined difference as the first frame is being presented.

42. A system, comprising:
a computing device comprising:
a memory for storing content of a sequence of frames; and
a frame predictor configured to
determine a difference between depth information calculated from content of a first frame and content of a second frame, wherein the first and second frames are adjacent in the sequence of frames,
determine velocity from the difference in depth information, wherein the velocity represents changes in an image included in the content of first frame compared to an image included in the content of the second frame;
produce an intermediate frame using the velocity as the first frame is being presented and as the second frame is being produced,
insert the intermediate frame between the first frame and the second frame in the frame sequence.

43. The system of claim 42, wherein inserting the intermediate frame includes determining an insertion position between the first and second frames.

44. The system of claim 43, wherein determining the insertion position is based upon a rate for presenting the frames.

\* \* \* \* \*

UNITED STATES PATENT AND TRADEMARK OFFICE
CERTIFICATE OF CORRECTION

| | | |
|---|---|---|
| PATENT NO. | : 8,619,198 B1 | Page 1 of 1 |
| APPLICATION NO. | : 12/430980 | |
| DATED | : December 31, 2013 | |
| INVENTOR(S) | : Dmitry Andreev | |

It is certified that error appears in the above-identified patent and that said Letters Patent is hereby corrected as shown below:

In the Claims:

At column 15, line 5, claim 14,
    Please delete "produced," and insert --produced;--

At column 16, line 50, claim 42,
    Please delete "to" and insert --to:--

At column 16, line 54, claim 42,
    Please delete "frames," and insert --frames;--

At column 16, line 62, claim 42,
    Please delete "produced" and insert --produced;--

Signed and Sealed this
Thirteenth Day of May, 2014

Michelle K. Lee
*Deputy Director of the United States Patent and Trademark Office*